Jan. 3, 1967  B. K. BIGLAND  3,295,164
EXTRUDERS
Filed April 29, 1964  2 Sheets-Sheet 2
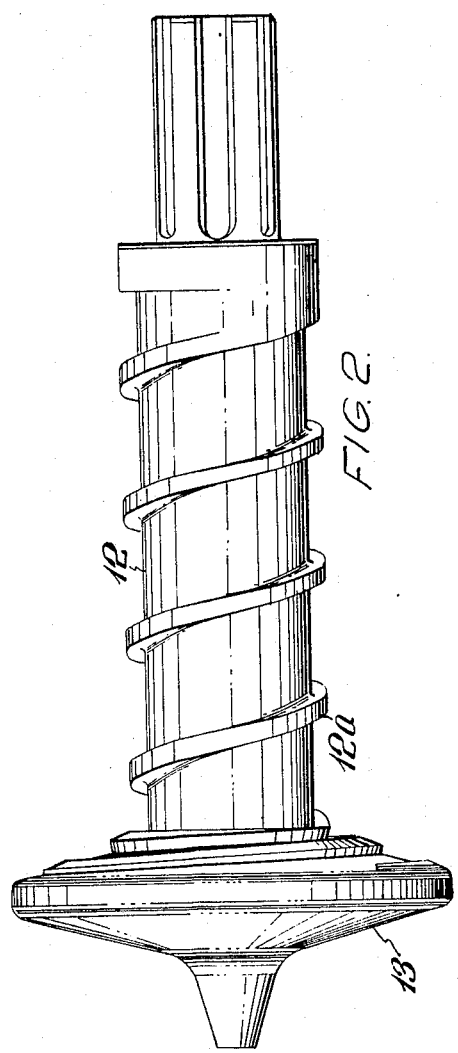
Bernard K. Bigland
INVENTOR.
BY:
Bierman + Bierman though not essentially, the slope of the thread of variable flight depth, as is fully described in the specification of co-pending application Serial Number 363,378 filed April 29, 1964.

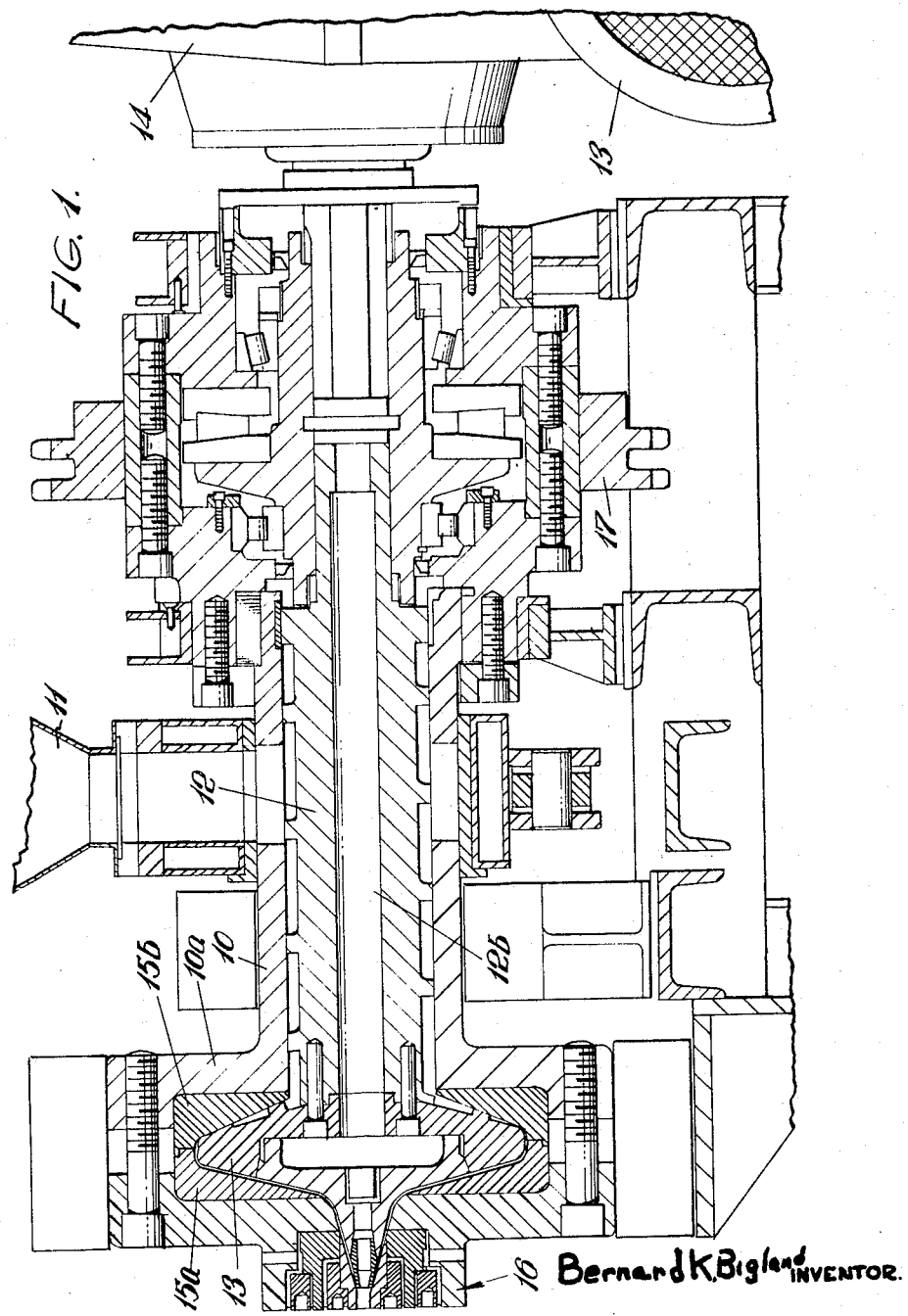

United States Patent Office 3,295,164
Patented Jan. 3, 1967

3,295,164
EXTRUDERS
Bernard Keith Bigland, Bolton, England, assignor to The General Engineering Co. (Radcliffe) Limited, Radcliffe, Lancashire, England, a corporation of Great Britain
Filed Apr. 29, 1964, Ser. No. 363,377
Claims priority, application Great Britain, May 1, 1963, 17,082/63
6 Claims. (Cl. 18—12)

The invention relates to extruders of the kind, hereinafter termed the kind referred to comprising a housing and complementary rotatable working feed screw therein, and is particularly, but not exclusively, applicable to extruders for use with thermo-plastic materials.

The operation of extrusion has for one of its functions to "compound" or mix the ingredients into a homogenous mass and this requires "shear working" of the materials as they are formed into such mass. These principles are of course well known but the main problems involved are to obtain a balance between shear working and output without in the case of high viscosity materials, exceeding the critical temperature of the materials through work-generated heat or, in the case of low viscoscity materials, obtaining enough shear for proper compounding with heat generation for reaching the required "melt" temperature; whilst in both cases maintaining a required delivery volume.

Fundamentally, an extruder consists of a feed screw in a housing, usually a helical screw and cylindrical barrel. During passage of the material between the feed screw and the barrel it is subjected to "shear" under temperature control, by heating or cooling the barrel and/or the screw, and in order to produce the required shear conditions it is the practice to have a cylindrical barrel and progressively to increase the root diameter of the feed screw and thereby decrease the "flight depth" towards the delivery end of the extruder. This decrease, in the absence of some other change, also reduces the "swept volume" and therefore reduces the delivery output. Consequently the present proportions for the feed screw and barrel of an extruder with progressively decreasing flight depth of the screw are in reality a compromise or balance between reducing the flight depth for increased shear while avoiding too much resultant loss of output.

It is known in an extruder to vary the pitch of the flight in the length of the screw but while this variation may be used to maintain the swept volume it also affects the function of the screw as a means for forcing the material forward and modifies the length of the mean flight path with known consequences and limitations. The useful scope of pitch variation for avoiding loss of output is therefore very limited and this variant as well as the available compromise aforesaid still leaves much to be desired.

A basic problem still exists and the object of the present invention is to enable shear conditions in an extruder to be increased without necessarily affecting its output.

The present invention is based upon the appreciation that the "swept volume" of a screw feed type extruder, which determines its output, is a function of the lineal dimension of the shear-working passage as well as of the other dimensions of its depth and pitch, all of which dimensions determine the shear-working factor, and upon the conception of the possibility of modifying such lineal dimension with or without modifying the others thereby to obtain the desired balance between sheer working and output as well as the desired output.

According to the invention an extruder comprising a housing and complementary feed screw therein defining a flight passage and working zone for the material to be extruded is characterised in that at least part of said working zone is spiral so that its lineal factor increases progressively in the direction of movement of the material.

The term "spiral" is used herein to include not only a regular spiral in which the radial component is constant but one in which such component is not constant, and it also includes a spiral with or without an axial, as well as a radial, component.

The said spiral flight passage may be a continuation on an antecedent helical flight passage.

In the accompanying drawings:

FIG. 1 is a longitudinal section of one example of an extruder made in accordance with the present invention.

FIG. 2 is a diagrammatic isometric view of the screw shown in FIG. 1.

The extruder shown consists of the usual essential elements respectively a cylindrical barrel 10, a hopper 11 to feed the material into the barrel, a helical feed screw 12 rotatably mounted in the barrel and power means consisting of a motor and reduction gear for rotating the feed screw. It differs however from the conventional construction primarily in the construction of the feed screw and barrel as will appear from the following detailed description of the drawing.

As can more clearly be seen from FIG. 2 the feed screw has an initial cylindrical portion indicated as 12 with a helical screw thread 12a formed on its periphery, the pitch thereof being uniform as also the depth or "flight" of the screw thread. At the left hand (as shown) there is a head portion of general bi-conical shape, that is to say conical on each side, with a rounded mergant peripheral edge 13b. On the rear face is a spiral screw thread 13a the flight or depth of which decreases outwardly but the pitch of the spiral is such that the swept volume in the extension zone thus provided remains substantially constant. The other face 13 is plain and forms a flow passage leading to an extrusion nozzle as decribed later. The spiral screw thread 13a is arranged to provide continuity relative to the helical screw thread 12a. On the outer end of the head portion is a 2-part housing 15a, 15b secured against a flange 10a of the barrel 10, which housing together with the head forms an extension of the shear working space of the extruder. The nose 13c is complementary to the extrusion nozzle. The head may be constructed to embody heating or cooling space, complementary to the space 12b often provided in the helical feed screw.

The example illustrated in the drawing shows some constructional details of a practical example which are not directly relevant to the extrusion working zones. However it can be noted that the barrel 10 is rotatably mounted and a chain sprocket 17 is provided to enable the barrel to be rotated in the same, or opposite, direction to the feed screw, as may be desired, with a view to modifying the shear-working factor of the screw and barrel and simultaneously of the extension zone.

The construction above described enables the cylindrical portion of the feed screw and barrel to perform the basic function of feeding the material forward whilst subjecting it to some degree of shear working. The head portion provides a higher degree of shear working with change of flight without the same degree of reduction of output as would result from trying to obtain such degree of working with a normal cylindrical screw and barrel. The head is separable from the cylindrical feed screw 12 and the housing 15a, 15b is separable from the barrel 10, so that the feed screw, head and housing are each or all easily changeable for others where any particular use calls for different factors of feed and shear working.

It is to be understood that the invention includes a construction in which the extrusion material is fed directly to the spiral working zone wtihout an antecedent normal cylindrical feeding and working zone, as in the example herein described.

What I claim is:
1. An extruder comprising a barrel, a feed screw mounted within said barrel, a hopper for feeding material to said screw, means for rotating said screw at one end thereof, a working zone for said material fixed on the other end of said screw, said working zone having a biconical head, the inner face of said head having a spiral working screw, the depth thereof decreasing outwardly and the pitch thereof being such that the volume in said zone is substantially constant, the outer face of said head being substantially plain.

2. An extruder according to claim 1 in which the outer end of said plain face has a tapering nose.

3. An extruder according to claim 1 in which means are provided for rotating said barrel independently of said feed screw and head.

4. An extruder according to claim 1 in which said head is held in extension of said barrel.

5. An extruder according to claim 1 in which said head is held in an extension of said barrel and a two-part housing in said extension embraces said head and forms a flight passage therewith.

6. An extruder according to claim 1 in which the outer end of said plain face has a tapering nose, means are provided for rotating said barrel independently of said feed screw and head, said head is held in an extension of said barrel, a two-part housing in said extension embraces said head and forms a flight passage therewith, the depth of said spiral flight passage decreases progressively with increase of the radial factor of the spiral, said spiral flight passage is a continuation of an antecedent helical flight passage and said antecedent helical flight passage has a substantially constant depth and pitch.

References Cited by the Examiner
UNITED STATES PATENTS

| | | | |
|---|---|---|---|
| 1,320,718 | 11/1949 | Steinle | 18—12 |
| 2,705,343 | 4/1955 | Hendry | 18—12 X |
| 2,765,490 | 10/1956 | Zona | 18—12 |
| 2,910,726 | 11/1959 | Parshall et al. | 18—12 |
| 3,102,694 | 9/1963 | Frenkel | 18—12 X |
| 3,197,814 | 8/1965 | Bond et al. | 18—12 |
| 3,226,766 | 1/1966 | Van Zelewsky et al. | |

WILLIAM J. STEPHENSON, *Primary Examiner.*